United States Patent
Wan et al.

(10) Patent No.: US 7,709,574 B2
(45) Date of Patent: May 4, 2010

(54) INORGANIC BLOCK CO-POLYMERS AND OTHER SIMILAR MATERIALS AS CERAMIC PRECURSORS FOR NANOSCALE ORDERED HIGH-TEMPERATURE CERAMICS

(75) Inventors: Julin Wan, Rexford, NY (US); Patrick Roland Lucien Malenfant, Clifton Park, NY (US); Mohan Manoharan, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/488,521

(22) Filed: Jul. 18, 2006

(65) Prior Publication Data

US 2007/0099791 A1     May 3, 2007

Related U.S. Application Data

(63) Continuation-in-part of application No. 11/265,990, filed on Nov. 3, 2005.

(51) Int. Cl.
*C04B 35/56* (2006.01)
*C08F 293/00* (2006.01)

(52) U.S. Cl. .......... 525/79; 525/118; 525/478; 525/102; 428/427; 428/428; 523/209; 523/221

(58) Field of Classification Search .......... 525/102, 525/118, 478, 79; 528/7; 428/427, 428; 523/209, 221
See application file for complete search history.

(56) References Cited

U.S. PATENT DOCUMENTS

| | | |
|---|---|---|
| 4,148,838 A | 4/1979 | Martin |
| 5,200,436 A | 4/1993 | Kumar et al. |
| 5,229,179 A | 7/1993 | Kumar et al. |
| 5,229,468 A | 7/1993 | Jensen |
| 5,237,020 A | 8/1993 | Clouet |
| 5,371,147 A | 12/1994 | Spinelli et al. |
| 5,437,825 A | 8/1995 | Jensen |
| 6,592,991 B1 * | 7/2003 | Wiesner et al. ............. 428/404 |
| 7,077,991 B2 * | 7/2006 | Wan et al. .................. 264/405 |
| 7,087,656 B2 * | 8/2006 | Garcia et al. ................. 521/63 |
| 2005/0159293 A1 | 7/2005 | Wan et al. |

FOREIGN PATENT DOCUMENTS

| | | |
|---|---|---|
| EP | 0997484 A1 | 3/2000 |
| EP | 1179566 A1 | 2/2002 |
| EP | 1375605 A2 | 2/2004 |
| GB | 2188056 | 3/1986 |
| WO | WO94/14725 | 7/1994 |
| WO | WO00/71606 A1 | 11/2000 |

OTHER PUBLICATIONS

European Search Report—Dec. 22, 2006, Partial European Search Report for EP 06255642.
Search Report—Feb. 14, 2007, for European Patent Application No. EP 06 25 5642.

\* cited by examiner

*Primary Examiner*—Irina S Zemel
(74) *Attorney, Agent, or Firm*—Paul J. DiConza

(57) ABSTRACT

The present invention is generally directed to methods of making ceramics with nanoscale/microscale structure involving self-assembly of precursor materials such as, but not limited to, inorganic-based block co-polymers, inorganic-/organic-based hybrid block co-polymers, and other similar materials, and to the structures made by such methods. Where such precursor materials are themselves novel, the present invention is also generally directed to those materials and their synthesis.

7 Claims, 22 Drawing Sheets

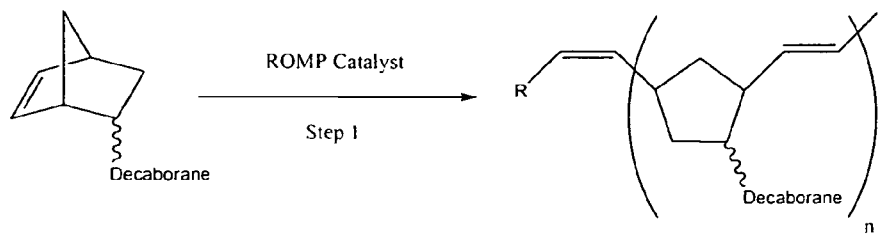
Scheme 1
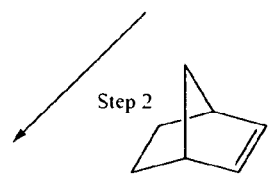
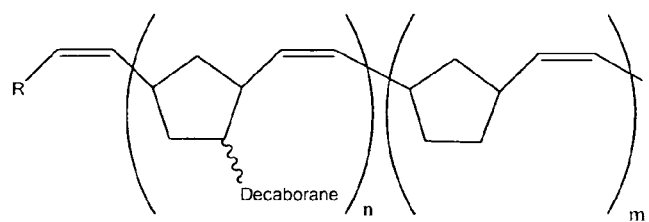
Hybrid Block Copolymer
Fig. 1

A
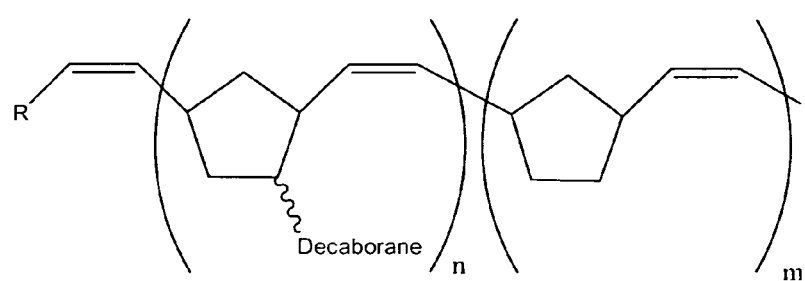
B
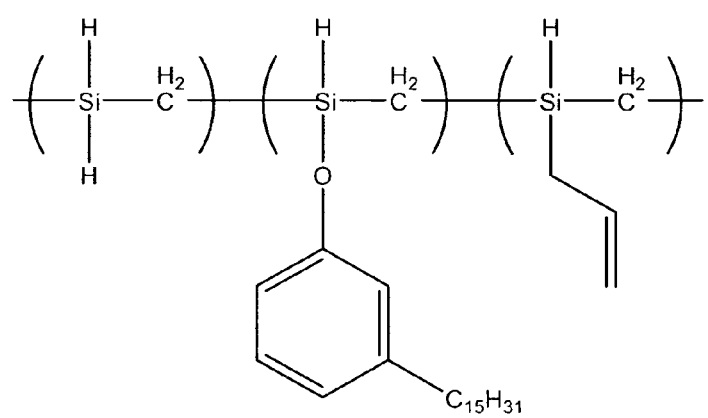
Fig. 2

Scheme 2

R = Decaborane, or H

A
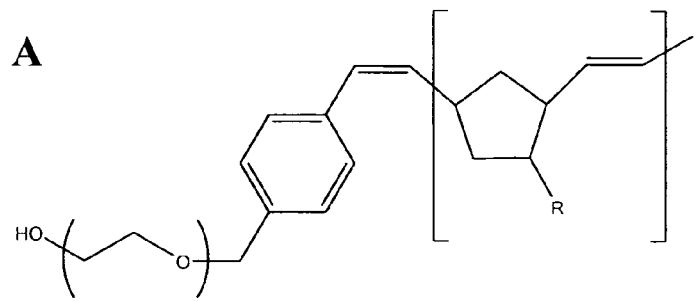
B
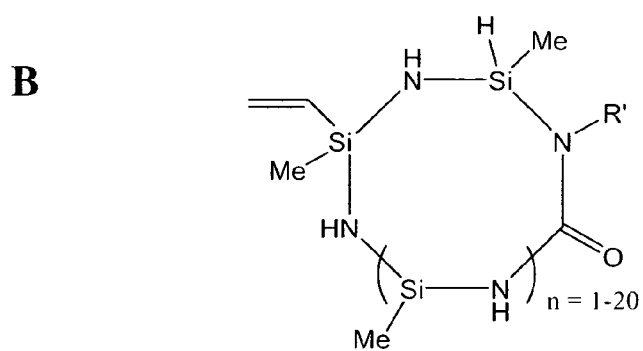
R = H, CH=CH2
C
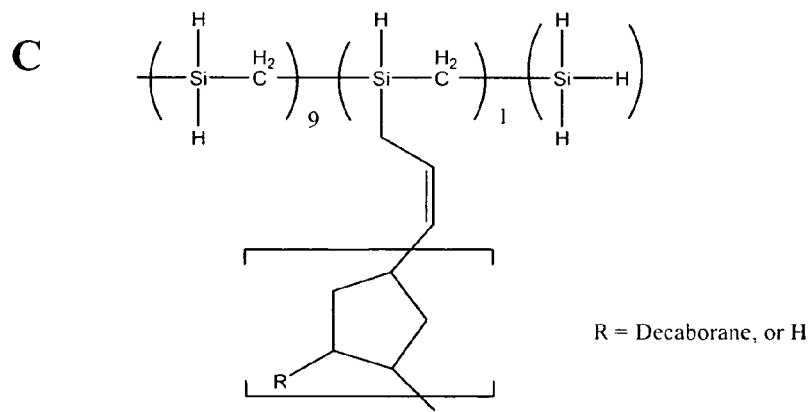
R = Decaborane, or H
*Fig. 4*

A
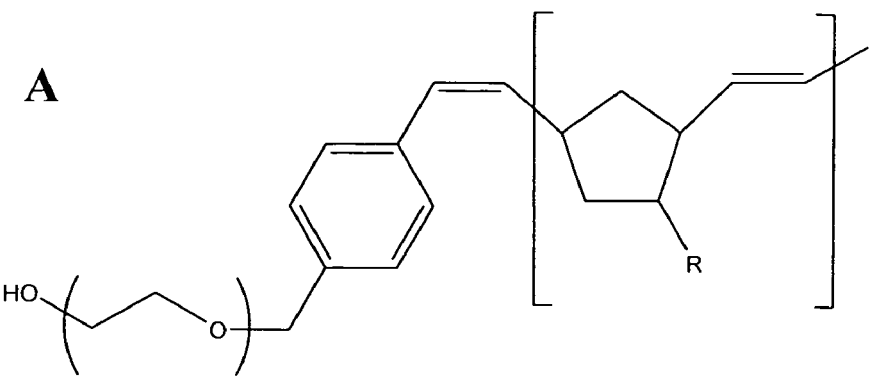
B
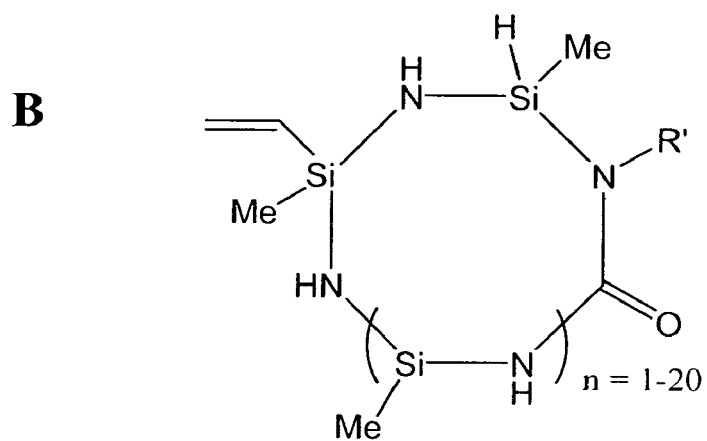
R = H, CH=CH2
*Fig. 5*

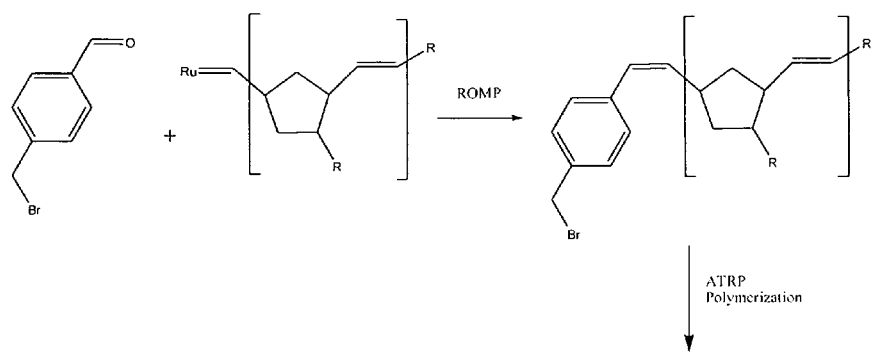
Scheme 3
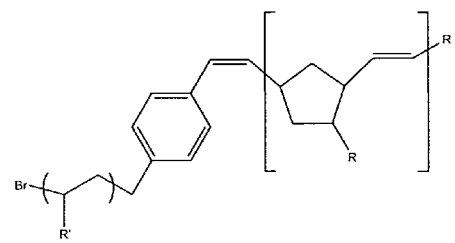
*Fig. 6*

Scheme 5

Scheme 6 arrows mark equivalent sites in the two chemical maps

US 7,709,574 B2

INORGANIC BLOCK CO-POLYMERS AND OTHER SIMILAR MATERIALS AS CERAMIC PRECURSORS FOR NANOSCALE ORDERED HIGH-TEMPERATURE CERAMICS

CROSS-REFERENCE TO RELATED APPLICATIONS

This Application for Patent is a Continuation-In-Part of U.S. patent application Ser. No. 11/265,990, filed Nov. 3, 2005.

TECHNICAL FIELD

The present invention relates generally to ceramic materials, and more particularly to nanoscale and microscale ceramic structures made by self-assembly of inorganic block co-polymers and other similar materials.

BACKGROUND INFORMATION

Composite materials having long-range order exist in nature. Natural composites, such as seashells, exhibit extraordinary mechanical properties that stem from the unique hierarchically-ordered structure in these materials. This realization has consequently triggered an effort to mimic nature by building long-range ordered structures at the nanoscale level. Order on the nanoscale can be used in turn to create hierarchically-ordered structures on micron and millimeter scales.

The technology to produce nanoscale inorganic ordered structures includes "top-down" approaches, such as sequential deposition and nanolithography, and "bottom-up" approaches, such as self-assembly based on ionic and non-ionic surfactants and block copolymers. Inorganic ceramic materials, such as silica and oxides having nanoscale order, have been obtained by self-assembly using organic species as structure-directing agents. Polymeric precursors have been used to develop nanotubes and nanofibers of boron nitride, boron carbide, and silicon carbide, and to fabricate high temperature micro-electromechanical systems (MEMS) with dimensions in the micron to sub-millimeter range. Block co-polymers have been used to fabricate nanostructured arrays of carbon.

Self-assembly of inorganic precursors by way of block co-polymers or surfactants is emerging as a powerful technique to build nanoscale structures in ceramics materials. Due to excellent control of dispersity in molecular weight of block co-polymers, some of the structures built therefrom possess long-range order. Current technologies along this line use organic block co-polymers. A certain ceramic precursor additive is miscible with one block in the block co-polymer, therefore when in co-existence with the block co-polymer, the precursor additive selectively targets that particular block (phase targeting). The block co-polymer can self-assemble into various structures, with the morphology and size scale determined by molecular weight and its polydispersity, volume fraction between blocks, and processing conditions. Due to this self-assembly and phase targeting of the ceramic precursor additive, structures comprising the precursor additive can thus be realized. When the self-assembled mixture of block co-polymer and precursor additives is heated to high temperatures, the block co-polymer decomposes, and the precursor additives are converted to ceramics, with nanoscale structure (nanostructure) inherited from the block co-polymer/precursor additive hybrid (see U.S. Pat. No. 7,056,849 B2).

The above-described process, however, has areas which can be improved upon, such the effectiveness of phase targeting. Functionalization of the ceramic precursor additives is needed in order to achieve phase selectivity. In most cases, the solubility of the precursor additives in a block is limited, even after functionalization. Furthermore, the organic block co-polymer in the above-described process serves as a structure-directing template, and it is a sacrificial component that needs to be removed during ceramization. The removal of the block co-polymer template causes low overall ceramic yield, adds to the problems of volume shrinkage and gas evolution during the pyrolysis process.

As a result of the forgoing, an alternative method of generating such nanoscale ordered high-temperature ceramics would be desirable—particularly wherein such an alternative method is capable of overcoming the above-described yield and gas evolution limitations.

BRIEF DESCRIPTION OF THE INVENTION

The present invention is generally directed to methods of making ceramics with nanoscale/microscale structure involving self-assembly of precursor materials such as, but not limited to, inorganic-based block co-polymers, inorganic-/organic-based hybrid block co-polymers, and other similar materials, and to the structures made by such methods. Where such precursor materials are themselves novel, the present invention is also generally directed to those materials and their synthesis.

Some embodiments of the present invention set forth methods of making nanoscale/microscale ceramic structures. Generically, such structures are made by: (a) providing a quantity of ceramic precursor species (e.g., an inorganic-based block co-polymer), the precursor species being molecular and comprising at least two segments that differ in their ability to segregate into at least two phases, wherein at least one of the at least two segments is inorganic-based; (b) allowing the quantity of precursor species to self-assemble into primary structures having dimensional attributes in the range of from about 1 nm to about 100 μm; and (c) pyrolyzing the self-assembled primary structures to form secondary ceramic structures.

In some such above-described embodiments, the quantity of ceramic precursor species comprises block co-polymer comprising at least two blocks, wherein at least one block is inorganic-based, such block co-polymers being referred to herein as "inorganic-based block co-polymers." Accordingly, where such ceramic precursor species are inorganic-based block co-polymers that self-assemble into primary nano-/micro-structures that are polymer nano-/micro-structures, such polymer structures can be subsequently converted into ceramics with similar nano-/micro-structure via pyrolysis. A unique feature of such methods is that the inorganic components are integrated into the molecular structure of the block co-polymer, thereby avoiding the problems involved in using organic block co-polymer self-assembly, as described above. With the inorganic components built-in, self-assembly of the inorganic block co-polymer becomes a one component/one step operation, thereby greatly reducing the complexity of the process. Pyrolysis of the primary structure does not involve the decomposition of a sacrificial template, therefore providing advantages in increased ceramic yield and decreased volume shrinkage and gas evolution, thereby improving material integrity and providing a denser product.

Where such above-described ceramic precursor species are themselves novel, embodiments of the present invention are also directed to such novel species and methods for making same. In some such embodiments, the novel precursor species are novel inorganic-based block co-polymers. Such novel inorganic-based precursor species are typically made via at least two successive reactions of a type including, but not limited to, anionic polymerization, cationic polymerization, free radical polymerization, ring opening metathesis polymerization, ring opening polymerization, condensation polymerization, and combinations thereof.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 (Scheme 1) depicts the synthesis of a hybrid block co-polymer by ROMP, in accordance with some embodiments of the present invention;

FIGS. 2A and 2B depict an exemplary ROMP-prepared hybrid block co-polymer (A), as well as a suitable ceramic precursor additive (B) that can be used with the block co-polymer in preparing primary/secondary structures, in accordance with embodiments of the present invention;

FIGS. 4A-4C depict a ceramic precursor system comprising an organic-based block co-polymer (4A), a ceramic precursor additive (4B), and a hybrid block co-polymer (4C), in accordance with some embodiments of the present invention;

FIGS. 5A and 5B depict an organic-based block co-polymer (A) for use in the ceramic precursor system comprising Ceraset®, as described in EXAMPLE 6;

FIG. 6 (Scheme 3) depicts the synthesis of a hybrid block co-polymer by living free radical polymerization and ROMP, in accordance with some embodiments of the present invention;

DETAILED DESCRIPTION OF THE INVENTION

Figure 3:
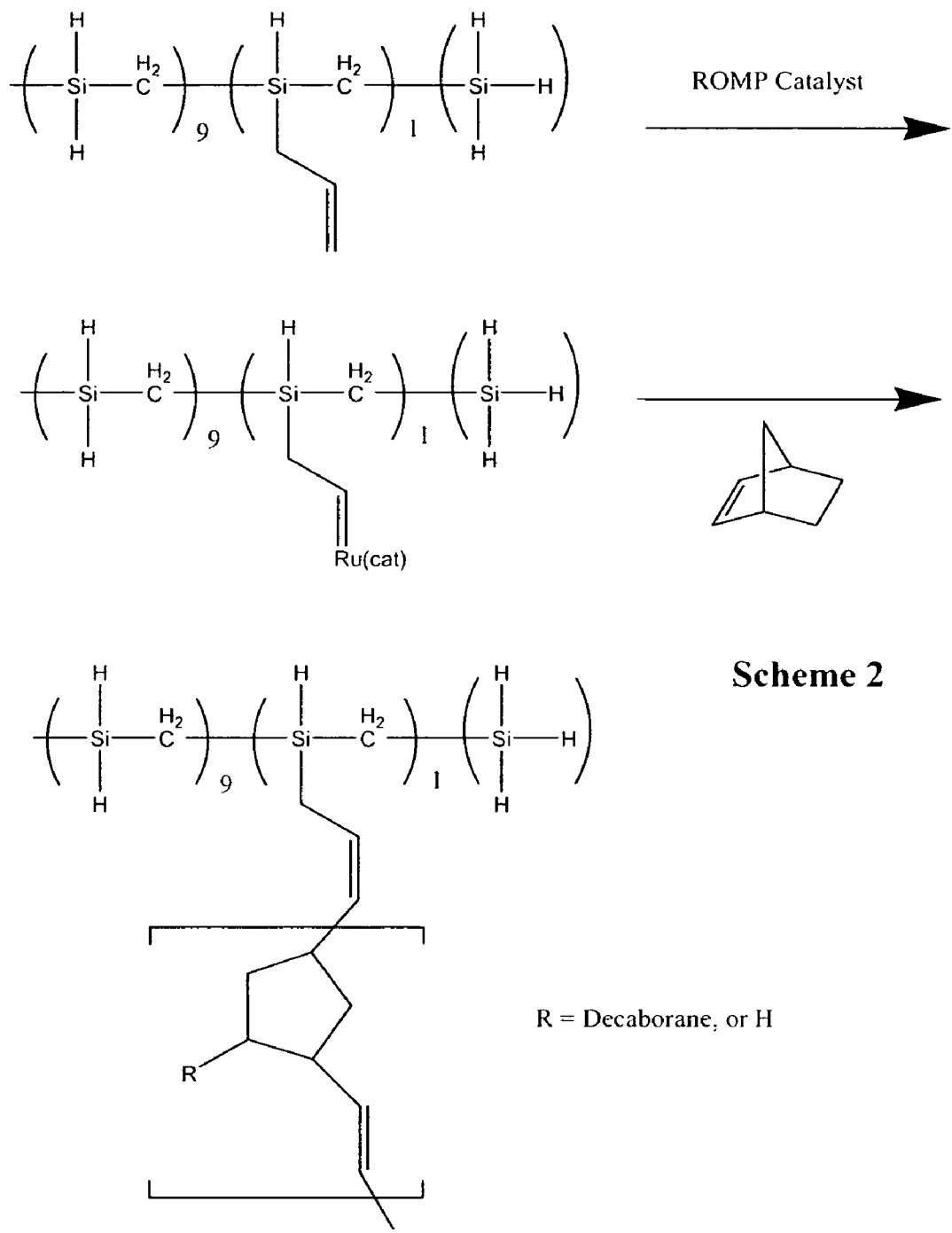
FIG. 3 (Scheme 2) depicts, when R=H, the synthesis of a hybrid block co-polymer, in accordance with some embodiments of the present invention, and, when R=decaborane, the synthesis of an inorganic-based block co-polymer that is entirely inorganic-based, in accordance with some embodiments of the present invention.

The present invention is generally directed to methods of making ceramics with nanoscale/microscale structure involving self-assembly of precursor materials such as, but not limited to, inorganic-based block co-polymers, inorganic-/organic-based hybrid block co-polymers, and other similar materials, and to the structures made by such methods. Where such precursor materials are themselves novel, the present invention is also generally directed to those materials and their synthesis.

While most of the terms used herein will be recognizable to those of skill in the art, the following definitions are nevertheless put forth to aid in the understanding of the present invention. It should be understood, however, that when not explicitly defined, terms should be interpreted as adopting a meaning presently accepted by those of skill in the art.

Although the term "block co-polymer" conventionally has been applied to purely organic structures, the term "block co-polymer" as used herein applies more broadly to include structures comprising at least two blocks, regardless of whether those blocks are organic-based or inorganic-based. Generally, such blocks are polymeric and such block co-polymers capable of self-assembly. While in some embodiments such blocks are polymeric segments comprising identical mers, in other embodiments such blocks comprise random or alternating arrangements of different mers, e.g., one block could be a mixture of two or more different monomers. Generally, blocks are differentiated by their ability to phase segregate.

"Nanoscale," as defined herein, refers to a size regime that ranges from about 1 nm to about 500 nm. Something is "nanostructured" if it comprises nanoscale dimensionality (nanoscale in at least two dimensions).

"Microscale," as defined herein, refers to a size regime in the range of from about 500 nm to about 100 µm. Something is "microstructured" if it comprises microscale dimensionality (microscale in at least two dimensions).

Many of the structures described herein are "hierarchical" and can comprise structural elements on the nano-, micro-, and/or meso-scales.

"Inorganic-based," as defined herein, refers to molecular (e.g., polymer) segments comprising elemental constituents suitable for forming ceramic structures upon pyrolysis. Such elemental constituents include, but are not limited to, Si, C, N, B, O, Hf, Ti, Al, and the like, and combinations thereof.

"Organic-based," as defined herein, refers to molecular (e.g., polymer) segments primarily carbon and having an elemental composition that is generally insufficient for forming ceramic structures upon pyrolysis.

"Polymeric," as defined herein, generally refers to 1-dimensional connectivity in a molecular species comprising a quantity of "mers" that typically number at least about 4, wherein a "mer" is also referred to as a "monomeric building block."

"Polydispersity," as defined herein, refers to molecular weight distribution for a given polymer and is generally quantified via a "polydispersity index," where said index is defined as a ratio of weight average molecular weight to number average molecular weight.

"Self-assembly," as defined herein, refers to a propensity to self-organize (self-assemble) into a structured arrangement.

"Pyrolysis," as defined herein, is the heating of the self-assembled primary structure in either an inert or reactive environment, so as to ceramize the structure and form a secondary ceramic structure.

Some embodiments of the present invention set forth methods of making ceramic nanostructures and/or microstructures. Generically, such structures are made by: (a) providing a quantity of ceramic precursor species, the precursor species being molecular and comprising at least two segments that differ in their ability to segregate into at least two phases, wherein at least one of the at least two segments is inorganic-based; (b) allowing the quantity of precursor species to self-assemble into primary structures having dimensional attributes in the range of from about 1 nm to about 100 µm; and (c) pyrolyzing the self-assembled primary structures to form secondary ceramic structures.

Generally speaking, such self-assembled primary structures and corresponding secondary structures comprise a morphology including, but not limited to, spherical, cylindrical, lamellae, gyroid, perforated lamellae, bicontinuous, and the like. Such structures can be ordered and/or disordered, and they can be part of a larger hierarchical structure that comprises dimensional attributes ranging from the nanoscale to the macroscale.

The composition of the secondary structures is largely directed by the composition of the ceramic precursor species, but generally includes all ceramic compositions. Typical compositions include, but are not limited to, silicon carbide, silicon nitride, silicon carbonitride, silicon oxynitride, silicon boron carbonitride, boron nitride, boron carbide, boron carbonitride, silicon oxycarbide, and the like. The porosity of the secondary structure can also be controlled by the composition of the ceramic precursor species: species having a greater percentage of organic-based segments, for example, will likely lead to products with greater porosity upon pyrolysis. Such pyrolysis can be carried out in either an inert or reactive (e.g., reducing or oxidizing) atmosphere, and generally involves heating to temperatures in the range of from about 800° C. to about 2000° C. For example, ceramic precursors having decaborane as the precursor material may be pyrolyzed in argon to produce boron carbide, in nitrogen to produce boron carbonitride, or in ammonia to produce boron nitride (note that it should be understood that the use of ammonia does not preclude the presence of carbon in the boron nitride ceramic). Note that, in some embodiments, when desired, the secondary ceramic structure can be densified, for example, by an annealing process. Where such as-produced secondary ceramic structures possess a level of porosity, such densification can significantly reduce such porosity.

In some such above-described embodiments, the quantity of ceramic precursor species comprise block co-polymer comprising at least two blocks, wherein at least one block is inorganic-based. Accordingly, where such ceramic precursor species are inorganic-based block co-polymers that self-assemble, typically by way of micro-phase separation, into primary structures that are compositionally polymer structures, such polymer structures can be converted into ceramics with similar structure, such structure including nano- and/or micro-structure.

In some such above-described inorganic-based block co-polymers, all of the blocks are inorganic-based. In some other embodiments, such inorganic-based block copolymers comprise at least one organic-based block, such hybrid block co-polymers alternatively being termed "inorganic-/organic-based hybrid block co-polymers," or simply, "hybrid block co-polymers." Suitable inorganic-based blocks for use in such block co-polymers include, but are not limited to, polysilazane, polycarborane, polyureasilazane, polysilane, polycarbosilane, polyborazine, polyborazylene, polysiloxane, and the like. Other suitable inorganic-based blocks are derived from an organic-based polymer backbone comprising inorganic pendant groups, wherein the pendant groups provide for a ceramic structure upon self-assembly and pyrolysis. Suitable organic-based blocks for hybrid block co-polymers include, but are not limited to, polybutadiene, polycycloctadiene, polynorbornene, polyisoprene, polydimethylamino ethyl methacrylate, polyethylene oxide (PEO), polyvinylpyridine, polystyrene, polyhydroxystyrene, polyphenyleneoxide, polycarbonate, polyetherimide, polypropyleneoxide, polybutyleneteraphthalate, polyethyleneteraphthalate, and the like. Depending on the embodiment and desired product, the block co-polymer architecture can be selected from the group consisting of a di-block co-polymer, a tri-block co-polymer, multi-block co-polymer, a dendritic-linear hybrid co-polymer, star co-polymer, and combinations thereof. Generally, the block co-polymer has an average molecular weight in the range of about 1,000 to about 250, 000, typically in the range of from about 1,000 to about 100,000, and more typically in the range of about 1,000 to about 50,000. Generally, at least some of the at least one inorganic-based blocks is a high-temperature ceramic precursor.

In some embodiments, the block co-polymer has a polydispersity index in the range of about 1.0 to about 3.0. In some embodiments, especially where hybrid block co-polymers are employed, the level of polydispersity is highly controllable. In some embodiments, where monodispersity of molecular weight prevails during synthesis, the self-assembled primary structure is well-ordered. Typically, as the level of polydispersity increases, the degree of order found in the self-assembled primary structure decreases.

In some embodiments, ceramic precursor additive is used in combination with inorganic-based block co-polymer, collectively referred to as a precursor system, in the formation of primary and secondary structures. In some such embodiments, traditional organic-based block co-polymers are also added.

The uniqueness of such methods is that the inorganic components are integrated into the molecular structure of the block co-polymer, thereby avoiding at least some of the problems involved in using organic block co-polymer self-assembly with ceramic precursor additive, as described above. With the inorganic components built-in, self-assembly of the inorganic block co-polymer becomes a one-component/one-step operation, thereby greatly reducing the complexity of the process. Pyrolysis of the primary structure does not involve the decomposition of a sacrificial template, therefore providing advantages in increased ceramic yield and decreased volume shrinkage and gas evolution, correspondingly improving material integrity, and providing a denser product.

As mentioned above, where such above-described ceramic precursor species are themselves novel, embodiments of the present invention are also directed to such novel species and methods for making same. In some such embodiments, the novel precursor species are novel inorganic-based block co-polymers. Such species are described above. More generally, however, such novel species can be any such ceramic precursor species that is molecular in composition and comprises at least two segments that differ in their ability to self-assemble by segregating into at least two phases, wherein at least one of the at least two segments is inorganic-based.

When the above-described novel inorganic-based precursor species are inorganic-based block co-polymers, they are typically made via at least two successive reactions of a type including, but not limited to, anionic polymerization, cationic polymerization, free radical polymerization, ring opening metathesis polymerization, ring opening polymerization, condensation polymerization, and combinations thereof.

In some embodiments, such above-described inorganic-based block co-polymers are made by a method comprising the steps of: (a) synthesizing a first polymer segment; (b) synthesizing a second polymer segment; and (c) attaching the second polymer segment to the first polymer segment so as to form an inorganic-based block co-polymer comprising at least one inorganic-based block, wherein such attaching involves covalent bonding and is carried out in a manner selected from the group consisting of: in situ attachment during the formation of the second polymer segment, by growing the second polymer segment from the first polymer segment, attachment after synthesizing the second polymer segment, and combinations thereof.

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

Example 1

This Example serves to illustrate the synthesis of a hybrid block co-polymer by ROMP, in accordance with some embodiments of the present invention.

Referring to FIG. 1, the synthesis described in Scheme 1 involves the polymerization of a norbornene derivative having decaborane as a functional group. This monomer can be polymerized using common ROMP catalysts such as those described in Choi et al., Angew. Chem. Int Ed. 2003, 42, 1743-1746 and Wei et al., Organometallics, 2004, 23, 163-165. As described in Wei et al., the polymerization of decaborane functionalized norbornene can be effected by employing Generation 1 or 2 Grubbs catalysts. According to Choi et. al., a second block can be prepared from the first by simply adding a second monomer, in this case norbornene, to the reaction mixture once the decaborane functionalized monomer has been consumed. This reaction can be carried out in a single pot, the order of the monomers may be reversed, and subsequent termination and isolation can be done using common techniques familiar to those skilled in the art so as to form an inorganic-based block copolymer capable of forming boron carbide upon ceramization. A variation on this Example includes substitution of the norbornene in Step 2 with a functionalized norborene or cyclooctene derivative or other functionalized monomer susceptible to ROMP.

Example 2

This Example illustrates an exemplary ROMP-prepared hybrid block co-polymer, as well as a suitable ceramic precursor additive that can be used with the block co-polymer in preparing primary/secondary structures, in accordance with some embodiments of the present invention.

The above-mentioned hybrid block co-polymer is shown in FIG. 2A and was prepared as described in Example 1. Its combination with a modified Starfire polymer (MSFP), a silicon carbide (SiC) precursor, is anticipated to provide a phase segregated structure in which the hybrid block copolymer is used as a template and the polynorbornene (organic-based block) serves as the domain that will be swollen with MSFP. Upon pyrolysis, the resulting ceramic material is anticipated to have nanoscale domains comprising boron carbide and silicon carbide.

The above-mentioned ceramic precursor additive is shown in FIG. 2B. The ceramic precursor MSFP results from the Lewis acid-mediated reaction between 2-pentadecyl-phenol and polycarbosilane. The carbosilane is a commercially available material manufactured by Starfire Systems (NY).

Example 3

This Example illustrates the synthesis of a hybrid block co-polymer, in accordance with some embodiments of the present invention.

Referring to FIG. 3, Scheme 2 describes the synthesis of polymer grafted to carbosilanes precursor, where R=H. The ROMP catalyst must be appended to the carbosilanes in such a way that it remains active towards ROMP. This may be done by directly appending the catalyst via allyl silane functionalities (shown) or via an alternative olefin-based moiety that has been affixed to the carbosilanes backbone (not shown). Subsequent introduction of a suitable monomer, such as norbornene, can provide a star polymer with a carbosilanes core and polynorbornene arms. This provides a modified carbosilane that is designed to target carbon-rich organic blocks such polynorbornene, polycyclooctadiene, or polybutadiene.

Example 4

This Example illustrates the synthesis of an inorganic-based block-co-polymer that is completely inorganic-based, in accordance with some embodiments of the present invention.

Referring to FIG. 3, Scheme 2 describes the synthesis of polymer grafted to carbosilanes precursors, where R=decaborane. The ROMP catalyst must be appended to the carbosilanes is such a way that it remains active towards ROMP. This may be done by directly appending the catalyst via allyl silane functionalities (shown) or via an alternative olefin based moiety that has been affixed to the carbosilane backbone (not shown). Subsequent introduction of a suitable monomer, such as norbornene, should provide a star polymer with a carbosilanes core and polynorbornene arms. This provides an inorganic-based block copolymer with a star like architecture that would yield a nanostructure having SiC domains and boron carbide domains if pyrolysed in an inert atmosphere.

Example 5

This Example illustrates a precursor system comprising an organic-based block co-polymer, a hybrid block co-polymer, and a ceramic precursor additive, in accordance with some embodiments of the present invention. ROMP can be initiated from the chain end of an existing polymer such as PEO, as described in Castle et al., Macromolecules, 2004, 37(6), 2035-2040. In this Example, PEO is used as a macro-initiator for ROMP. Under modified conditions, the PEO segment may also be incorporated into a block copolymer architecture by functioning as a chain transfer agent.

Referring to FIG. 4, in this system Structure A is an organic-based block copolymer in which R=H. Structure B is phase targeted towards the PEO domains while the hybrid block copolymer depicted as Structure C (R=H) is expected to be targeted towards the polynorbornene domains found in Structure A. The resulting material is a nanostructured SiC—SiCN. In cases were R=decaborane, the resulting nanostructured product could be SiCN—SiCB.

Example 6

This Example illustrates a precursor system comprising a hybrid block co-polymer and a ceramic precursor additive, in accordance with some embodiments of the present invention.

Ceraset® is added to the structure depicted in FIG. 5. In this system, Structure A is an organic-based block copolymer in which R=H. Structure B is phase targeted towards the PEO domains. The resulting material is a nanostructured BC—SiCN if R=decaborane and the processing atmosphere is inert. In cases were R=decaborane and the processing atmosphere is ammonia, the resulting nanostructured product could be SiCN—BN.

Example 7

This Example illustrates the synthesis of a hybrid block co-polymer by living free radical polymerization and ROMP, in accordance with some embodiments of the present invention.

In this Example, a suitable initiating species is selected based on its ability to initiate both living free radical polymerizations via atom transfer radical polymerization (ATRP) as well as ROMP. Scheme 3 (FIG. 6) depicts how a living polymer synthesized using ROMP can be chain-end functionalized with 4-bromomethylbenzaldehyde to provide a polymer having a benzyl bromide chain end. This moiety can subsequently be used to synthesize a second block using a suitable vinyl monomer. In the case where R=decaborane, a hybrid block copolymer results. R' may be chosen such that the block made by ATRP can accommodate another ceramic precursor. For instance, where R'=PEO or polydimethylamino ethyl methacrylate, ceramic precursors such as Ceraset® could be incorporated.

Example 8

This Example serves to illustrate the in situ tri-block formation of a hybrid block co-polymer, in accordance with some embodiments of the present invention.

Figure 7:
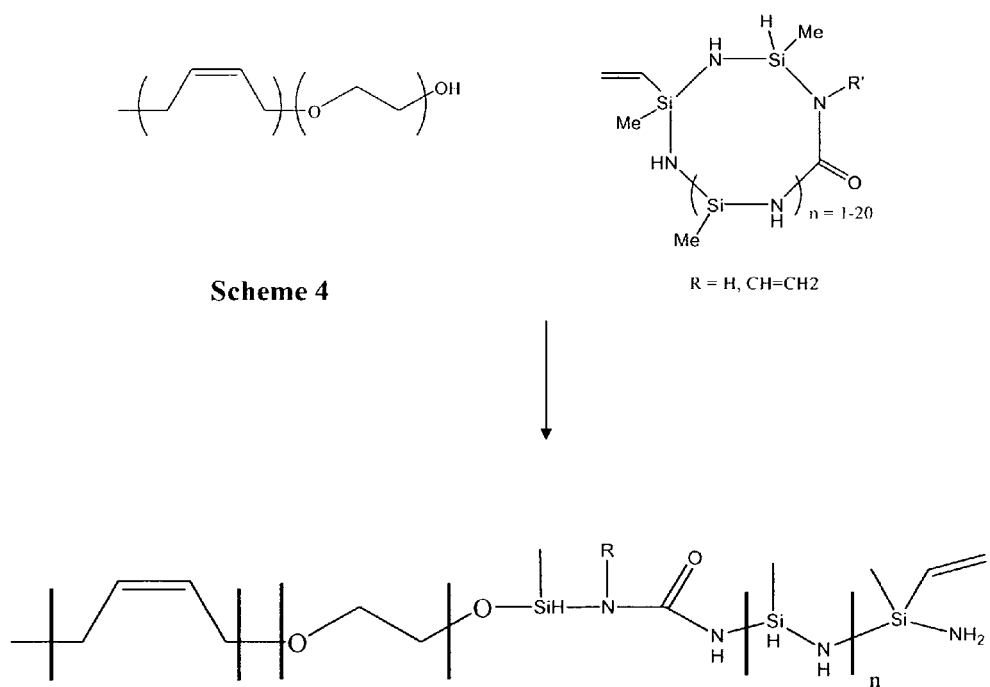
FIG. 7 (Scheme 4) depicts the in situ tri-block formation of a hybrid block co-polymer, in accordance with some embodiments of the present invention.
Figure 8:
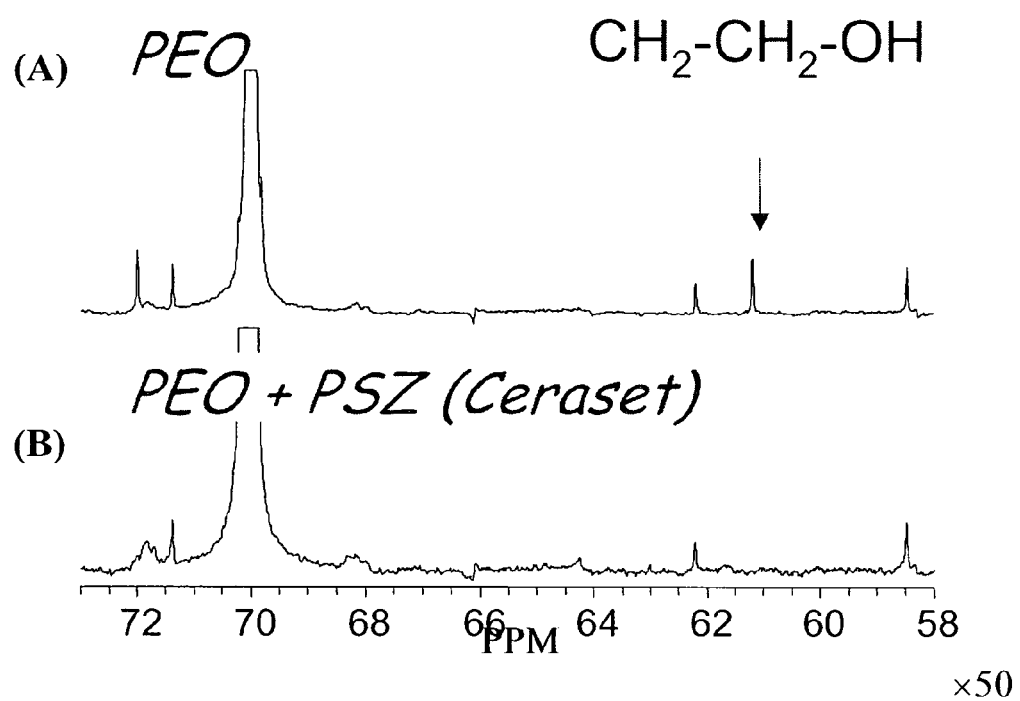
FIG. 8 depicts $^{13}C$ NMR spectra of PEO (Trace A) and PEO after reaction with Ceraset®(Trace B)

Referring to FIG. 7, Scheme 4 serves the purpose of demonstrating the ability to synthesize triblock copolymers in which one of the blocks is a ceramic precursor. In this particular example, Ceraset® reacts with the hydroxyl chain end of the PEO block yielding a Si—O linkage between Ceraset® and the block copolymer, which is enthalpically favored. This occurs in situ during the assembly of the block copolymer in the presence of Ceraset®. Referring to FIG. 8, evidence for the reaction can be seen in the $^{13}C$ nuclear magnetic resonance (NMR) spectrum of the product (Trace B) that results from reacting hydroxyl-terminated PEO (Trace A) with Ceraset® (polyureasilazane). It can be clearly seen in FIG. 8 that the peak shifts vary for the terminal ethylene group upon functionalization. Furthermore, capping of the terminal hydroxyl group prevents any reaction from occurring with Ceraset®, and Applicants have observed that this can severely hinder the incorporation of Ceraset® into the PEO domain, as well as preclude the formation of an ordered structure.

Example 9

This Example serves to illustrate the synthesis of a polynorbornene-block-polynorbornenedecaborane co-polymer containing 15 mol % polynorbornenedecaborane by ROMP, the subsequent self-assembly of the block copolymer into an ordered structure comprising lamellar and perforated lamellar structures, and the further pyrolysis of the self-assembled block copolymer into a nano-ordered ceramic comprising lamellar and perforated lamellar structures, in accordance with some embodiments of the present invention.

Figure 9:
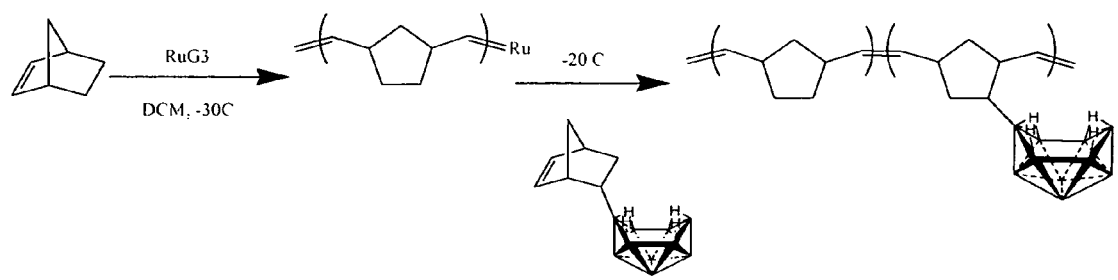
FIG. 9 (Scheme 5) depicts the synthesis of a polymorbornene-block-polynorbornenedecaborane copolymer by ROMP, in accordance with some embodiments of the present invention.

A solution of norbornene (1.0 g in 50 mL $CH_2Cl_2$, i.e., "DCM") was cooled to −30° C. using a dry ice acetone bath for 15 min. To this solution was added a 5 mL solution containing 80 mg of Grubb's Generation 3 (GG3) catalyst (see Choi et al., Angew. Chem. Int Ed. 2003, 42, 1743-1746) and the solution was stirred at −30° C. for 30 min. A solution of norbornene-decaborane (0.85 g in 10 mL DCM) was subsequently added to the reaction mixture. The reaction bath temperature was maintained at −20° C. for 15 min. The reaction was quenched with 2 mL of ethyl vinyl ether while stirring for 5 min. The reaction solution was added dropwise to 400 mL of pentane. Most of the pentane was decanted and the polymer was re-dissolved in DCM. The polymer was filtered through silica using DCM as the eluant. The collected polymer was dried in vacuo, re-dissolved in tetrahydrofuran (THF) and precipitated into 600 mL of pentane. The total yield after drying is 1.40 g. The synthesis reaction is shown in Scheme 5 (FIG. 9). Decaborane mol % content in the block copolymer was assessed by proton nuclear magnetic resonance ($^1H$ NMR).

Figure 10:
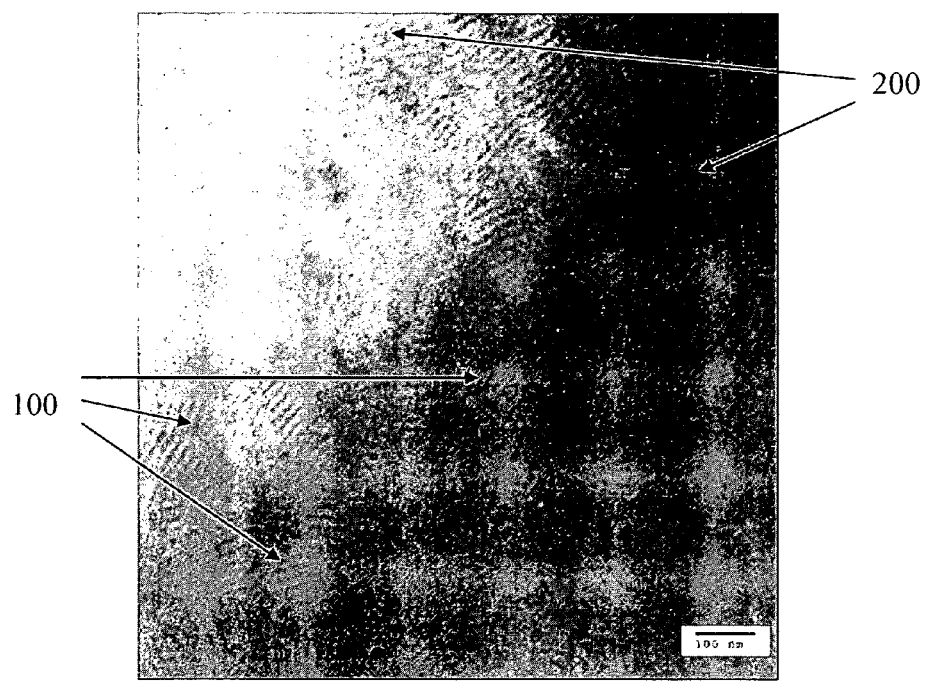
FIG. 10 is TEM image of self-assembled polynorbornene-block-polynorbornenedecaborane copolymer containing 15 mol % norbornenedecarborane, in accordance with some embodiments of the present invention, where region(s) 100 is representative of the dominant lamellar morphology and region(s) 200 is representative of perforated lamellar morphology.

The block copolymer was dissolved in chloroform (CHCl$_3$) and the solvent was allowed to evaporate under an inert atmosphere. The resulting film was then subjected to thermal annealing at 100° C. for 24 hours in a nitrogen atmosphere FIG. 10 is a transmission electron microscopy (TEM) bright field image of the self-assembled polymer, showing nanoscale-ordered structure dominated by lamellar morphology (e.g., regions 100). In certain locations, perforation of lamellae can be observed (e.g., regions 200).

Figure 11:
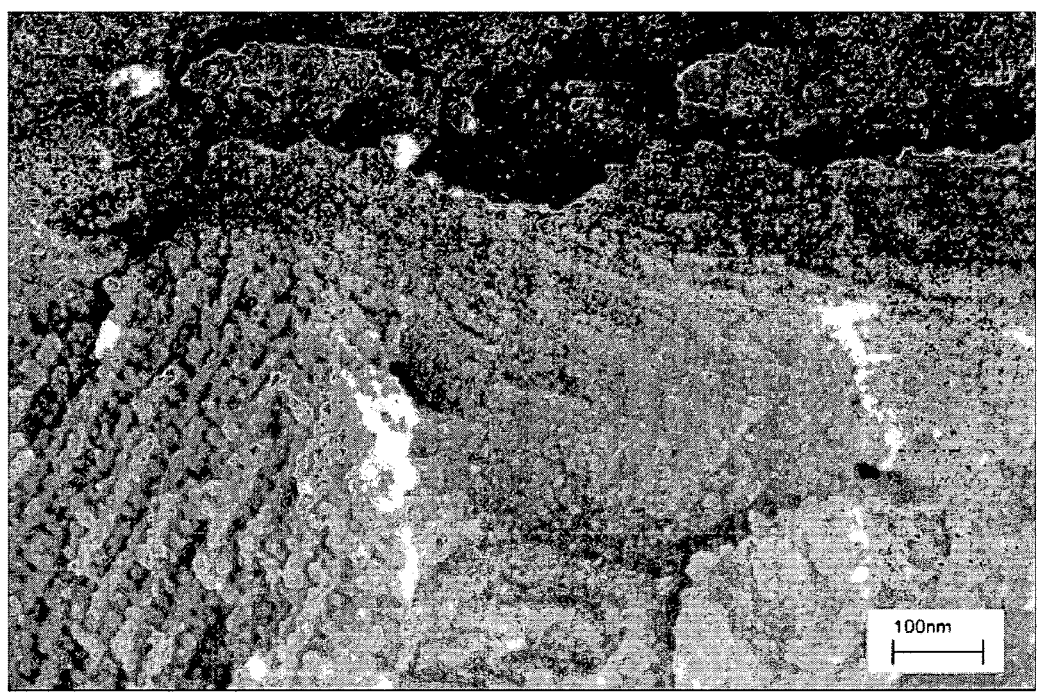
FIG. 11 is an SEM image of a pyrolyzed ceramic structure from polynorbornene-block-polynorbornenedecaborane copolymer containing 15 mol % norbornenedecaborane, in accordance with embodiments of the present invention, wherein the image depicts lamellar structure mixed with perforated lamellar structure.

The sample was subsequently transferred to a tube furnace where it was heated in a nitrogen atmosphere. The pyrolysis process involved heating the sample from room temperature to 400° C. at 5° C./min. followed by a dwell time of 1 hour at 400° C. A subsequent ramp cycle was then used to bring the sample to 1000° C. (1° C./min). The sample was held at 1000° C. for 4 hours. The structure of the pyrolyzed ceramics is shown in the scanning electron microscopy (SEM) image of FIG. 11. It can be seen from the figure that the pyrolyzed ceramics have inherited the morphology of the self-assembled polymer, which is a lamellar structure with regions of perforated lamellar structures.

Example 10

This Example serves to illustrate the synthesis of a polynorbornene-block-polynorbornenedecaborane co-polymer containing 30 mol % polynorbornenedecaborane by ROMP, subsequent self-assembly of the block copolymer via solvent evaporation into lamellar ordered structure, and further pyrolysis of the self-assembled block copolymer into a lamellar nano-ordered ceramic, in accordance with some embodiments of the present invention.

A solution of norbornene (0.5 g in 75 mL DCM) was freeze-pump thawed 3 times. To this solution was added a 3 mL solution containing 40 mg of GG3 catalyst that had been freeze-pump thawed 2 times. Both solutions were chilled to −25° C. prior to mixing. The resulting mixture stirred for 30 min. at −30° C. A solution of norbornene-decaborane (0.5 g in 10 mL DCM) was freeze-pump thawed 3 times and added to the reaction mixture. After 25 min., the reaction was quenched with 10 drops of ethyl vinyl ether. The reaction was directly precipitated into pentane and the white precipitate was filtered using a Buchner filter with filter paper. The polymer was dried overnight at room temperature providing 0.81 g of product. Decaborane mol % content in the block copolymer was assessed by proton nuclear magnetic resonance.

Figure 12A:
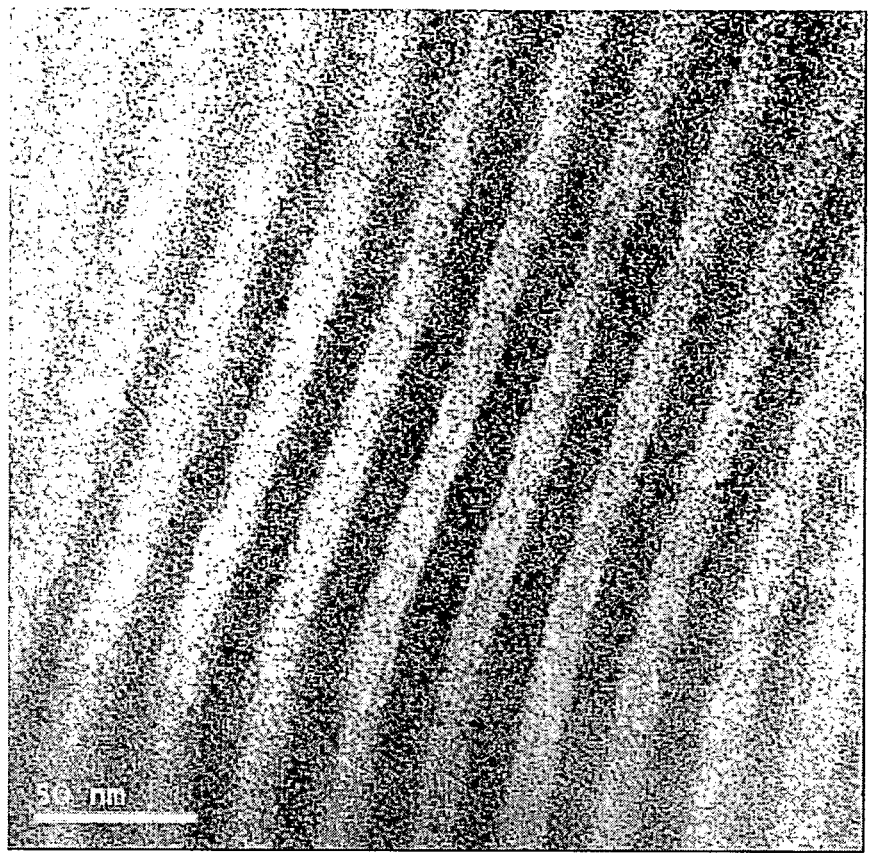
FIGS. 12A-12C are TEM images of lamellar structure (12A), along with chemical maps of boron (12B) and carbon (12C), of self-assembled polynorbornene-block-polynorbornenedecaborane copolymer containing 30 mol % norbornenedecaborane, in accordance with some embodiments of the present invention.
Figure 12B:
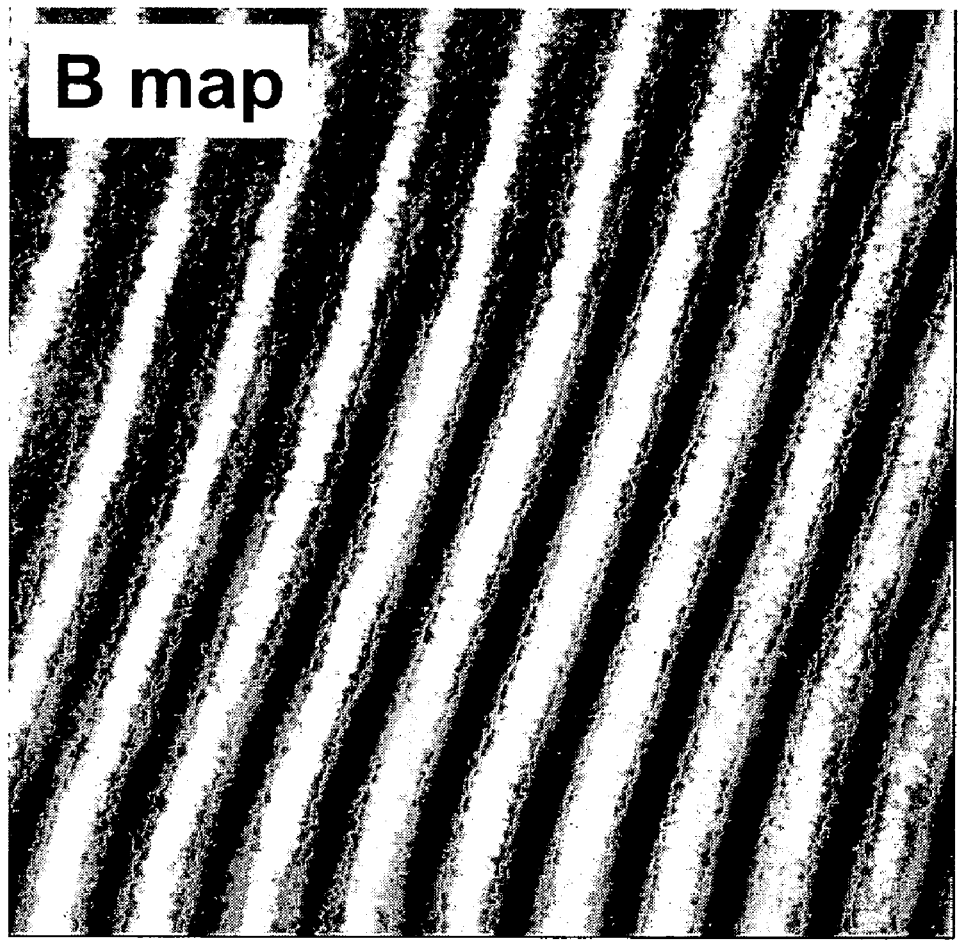
Figure 12C:
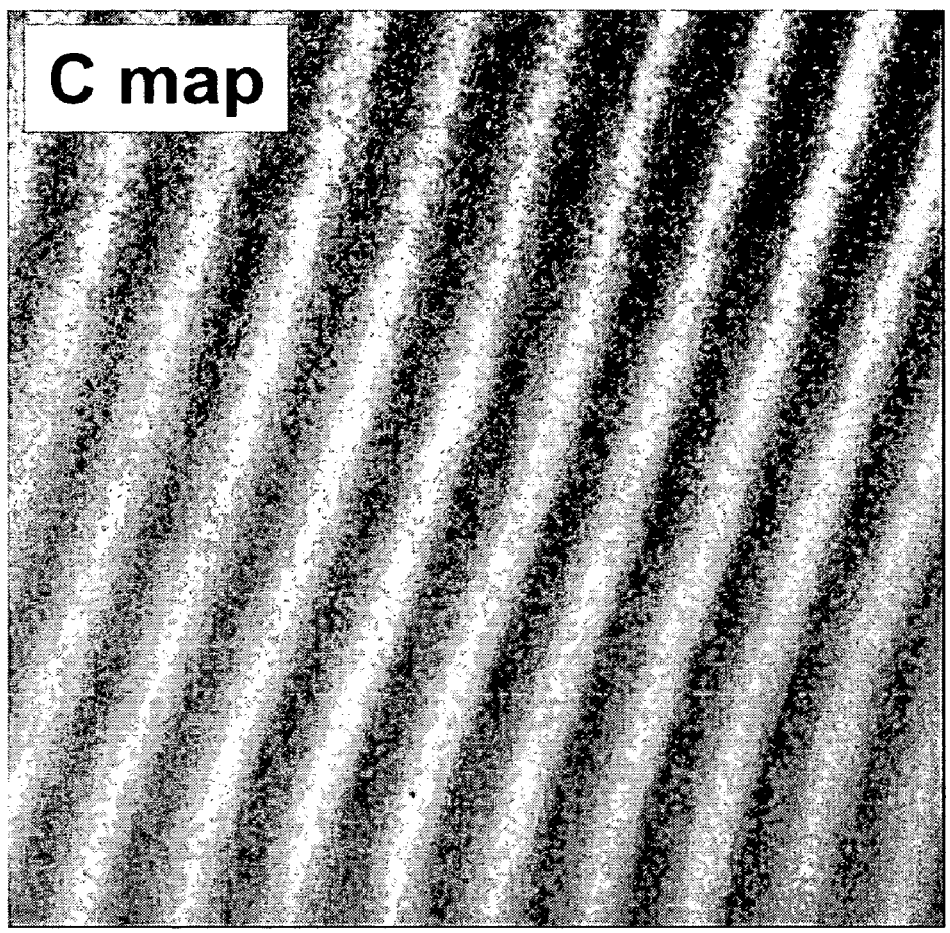

The block copolymer was dissolved in chloroform and the solvent was allowed to evaporate under an inert atmosphere. Self-assembly occurs during solvent evaporation. FIGS. 12A-12C are TEM bright field images of the self-assembled polymer (FIG. 12A) with the boron (bright regions, FIG. 12B) and carbon (bright regions, FIG. 12C) composition maps, showing a pure lamellar nanoscale-ordered structure morphology with alternating polynorbornene and polynorbornenedecaborane layers.

Figure 13:
FIG. 13 is an SEM image depicting a pyrolyzed ceramic structure from polynorbornene-block-polynorbornenedecaborane copolymer containing 30 mol % norbornenedecaborane, in accordance with embodiments of the present invention, the image showing lamellar structure.

The dried film was then subjected to thermal annealing at 100° C. for 24 hours in a nitrogen atmosphere. The sample was subsequently transferred to a tube furnace where it was heated in a nitrogen atmosphere. The pyrolysis process involved heating the sample from room temperature to 400° C. at 5° C./min. followed by a dwell time of 1 hour at 400° C. A subsequent ramp cycle was then used to bring the sample to 1000° C. (1° C./min). The sample was held at 1000° C. for 4 hours. The structure of the pyrolyzed ceramics is shown in the SEM image of FIG. 13. The pyrolyzed ceramics inherited the lamellar morphology of the self-assembled polymer.

Example 11

This Example serves to illustrate the synthesis of a polynorbornene-block-polynorbornenedecaborane co-polymer containing 30 mol % polynorbornenedecaborane by ROMP, the subsequent self-assembly of the block copolymer via solvent evaporation to form cylindrical, ordered structures, and further pyrolysis of the self-assembled block copolymer into a cylindrical ordered mesoporous BCN ceramic, in accordance with some embodiments of the present invention.

A solution of norbornene (1.5 g in 100 mL DCM) was cooled to −30° C. using a dry ice acetone bath for 15 min. To this solution was added a 5 ml solution containing 115 mg of GG3 catalyst. The resulting mixture stirred for 30 min. at −30° C. A solution of norbornene-decaborane (1.54 g in 10 mL DCM) was added to the reaction mixture quickly via syringe. The reaction bath temperature was maintained at −20° C. for 15 min., and allowed to warm up to 0° C. (15 min) and it continued for another 30 min. while warming up to 10° C. The reaction was quenched with 3 mL of ethyl vinyl ether. After 15 min., the reaction solution was concentrated down and DCM was added to end up with about 50 mL of solution. The polymer solution was added drop wise to 600 mL of pentane. Most of the pentane was decanted onto a filter, and the rest of the solution was placed in centrifuge tubes and stored overnight in a freezer. The polymer was dried overnight at room temperature (RT) providing 2.62 g of product from the centrifuge tubes. Total yield was 2.90 g.

Figure 14A:
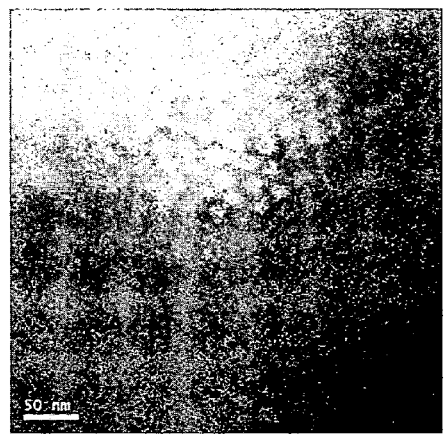
FIGS. 14A-14C are TEM images of cylindrical structure (14A), along with chemical maps of boron (14B) and carbon (14C), of self-assembled polynorbornene-block-polynorbornenedecaborane copolymer containing 30 mol % norbornenedecaborane, in accordance with some embodiments of the present invention.
Figure 14B:
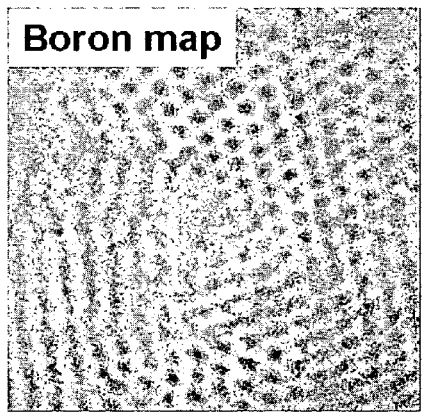
Figure 14C:
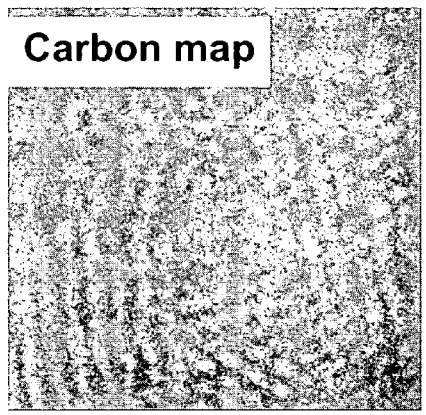

The block copolymer was dissolved in tetrahydrofuran and the solvent was allowed to evaporate under an inert atmosphere. Self-assembly happens during solvent evaporation. FIGS. 14A-14C are TEM bright field image of the self-assembled polymer (FIG. 14A) with the boron (FIG. 14B) and carbon (FIG. 14C) composition maps, showing cylindrical nanoscale-ordered morphology with polynorbornene as the cylinders and polynorbornenedecaborane as the matrix.

Figure 15:
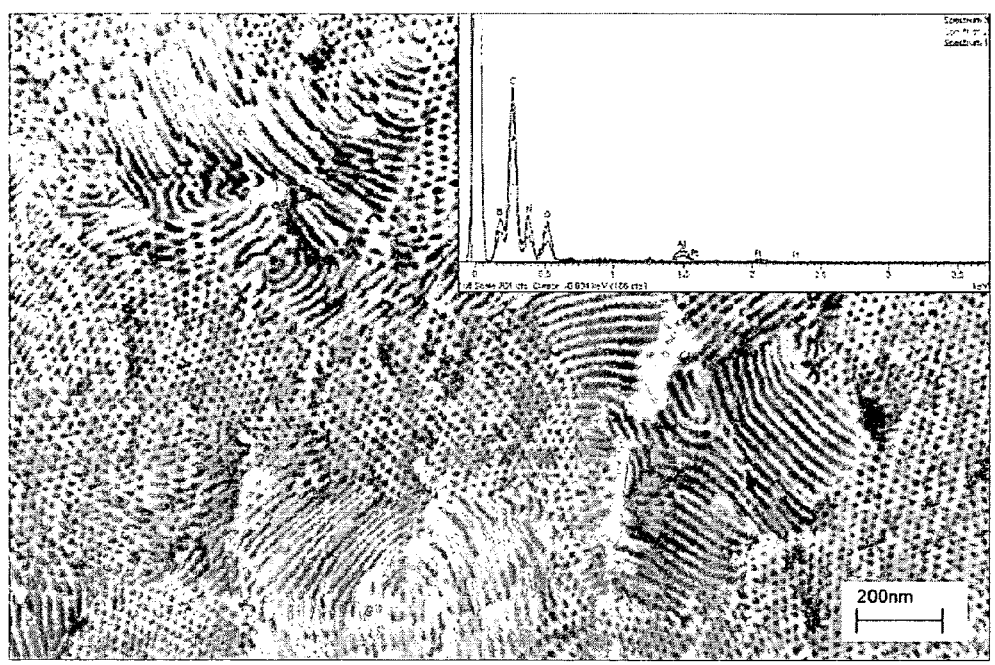
FIG. 15 is an SEM image depicting a pyrolyzed ceramic structure from polynorbornene-block-polynorbornenedecaborane copolymer containing 30 mol % norbornenedecaborane, in accordance with embodiments of the present invention, the image showing cylindrical structure and the inset revealing the BCN composition of the material.

The dried film was then subjected to thermal annealing at 100° C. for 24 hours in a nitrogen atmosphere. The sample was subsequently transferred to a tube furnace where it was heated in a nitrogen atmosphere. The pyrolysis process involved heating the sample from room temperature to 400° C. at 5° C./min. followed by a dwell time of 1 hour at 400° C. A subsequent ramp cycle was then used to bring the sample to 1000° C. (1° C./min.). The sample was held at 1000° C. for 4 hours. The structure of pyrolyzed ceramics is shown in the SEM image of FIG. 15. The pyrolyzed ceramics inherited the cylindrical morphology of the self-assembled polymer. The polynorbornenedecaborane block ceramizes into a BCN ceramic matrix, while the polynorbornene block decomposes and leaves behind nanosized cylindrical pores.

Example 12

This Example serves to illustrate the synthesis of a polynorbornene-block-polynorbornenedecaborane co-polymer containing 30 mol % polynorbornenedecaborane by ROMP, subsequent self-assembly of the block copolymer via solvent evaporation into cylindrically-ordered structures, and further pyrolysis of the self-assembled block copolymer into a cylindrically-ordered mesoporous BN ceramic, in accordance with some embodiments of the present invention.

A solution of norbornene (2.5 g in 50 mL DCM) was cooled to −40° C. using a dry ice/acetone bath. This solution was added to a 10 mL solution containing 191 mg of GG3 catalyst. The monomer was added quickly via funnel, and the funnel was rinsed with about 5-10 mL of DCM. After mixing, the reaction went for 30 min. at about −30° C. Subsequently, a solution of norbornene-decaborane (2.5 g in 20 mL DCM) was added to the reaction mixture quickly via syringe. The reaction bath temperature was maintained between −20° C. and −10° C. for 30-40 min. The reaction was quenched with 2.5 mL of ethyl vinyl ether and stirred for 15 min. at 0° C. The reaction solution was filtered through silica using DCM as the eluant. The overall volume was taken down to about 100 mL and was added dropwise to a mixture of 300 mL of pentane and 150 mL of pet ether. Most of the pentane/pet ether was decanted, and the residual solvent was removed by rotary evaporation. The polymer was dried at RT under vacuum. Total yield was 4.76 g.

Figure 16:
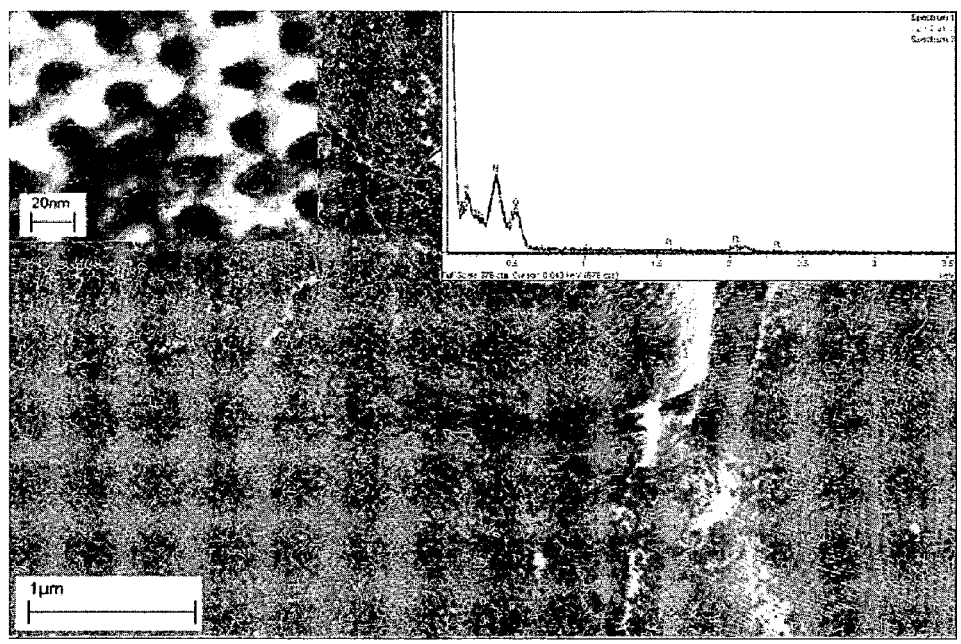
FIG. 16 is an SEM image depicting a pyrolyzed ceramic structure from polynorbornene-block-polynorbornenedecaborane copolymer containing 30 mol % norbornenedecaborane, in accordance with embodiments of the present invention, the left inset showing cylindrical structure and the right inset revealing the BN composition of the material.
Figure 17:
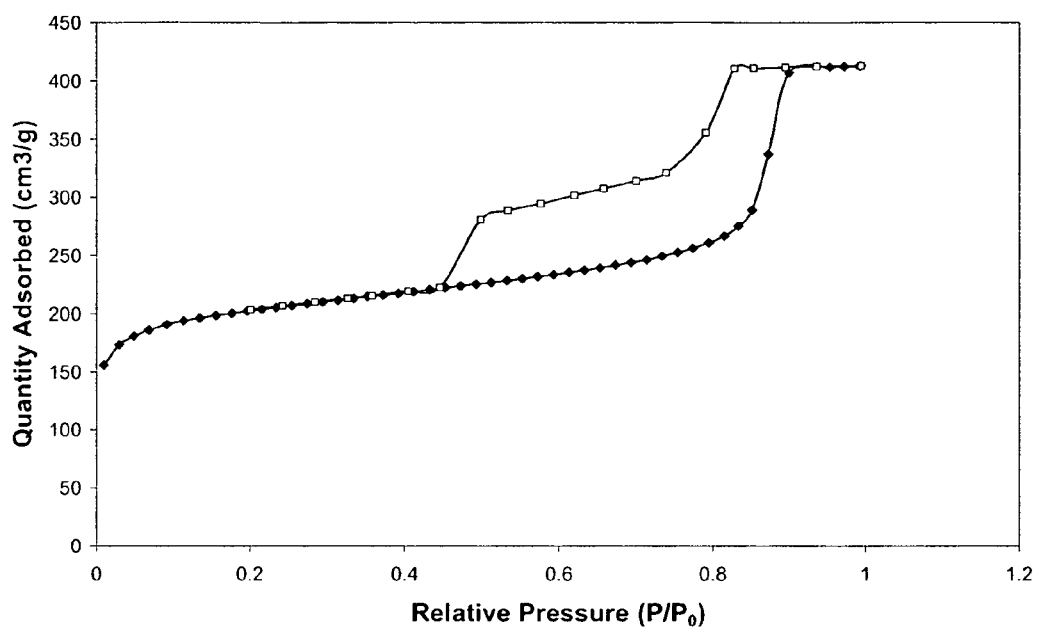
FIG. 17 is a BET adsorption-desorption isotherm of BN mesoporous ceramic from self-assembled polynorbornene-block-polynorbornenedecaborane copolymer containing 30 mol % norbornenedecaborane, in accordance with some embodiments of the present invention.

The block copolymer was dissolved in tetrahydrofuran and the solvent was allowed to evaporate under an inert atmosphere. Self-assembly happens during solvent evaporation. The dried film was then subjected to thermal annealing at 100° C. for 24 hours in a nitrogen atmosphere. The sample was subsequently transferred to a tube furnace where it was heated in an ammonia atmosphere. The pyrolysis process involved heating the sample from room temperature to 400° C. at 5° C./min., followed by a dwell time of 1 hour at 400° C. A subsequent ramp cycle was then used to bring the sample to 1000° C. (1° C./min). The sample was held at 1000° C. for 4 hours. The structure of the pyrolyzed ceramics is shown in FIG. 16. The pyrolyzed ceramics show cylindrical morphology, the composition is primarily BN. BET tests confirm the ordered ceramic is a mesoporous material with high surface area, as the example in FIG. 17 shows.

Example 13

This Example serves to illustrate the synthesis, by ROMP, of a polynorbornenesilazane-block-polynorbornenedecaborane co-polymer, in which the blocks are composed of polynorbornene backbone and silazane and decaborane pendant groups. Subsequent self-assembly of the block copolymer generates an ordered structure with polynorbornenesilazane and polynorbornenedecaborane in distinctly different domains. Further pyrolysis of the self-assembled block copolymer created ordered ceramics with a lamellar structure, in accordance with some embodiments of the present invention.

Figure 18:
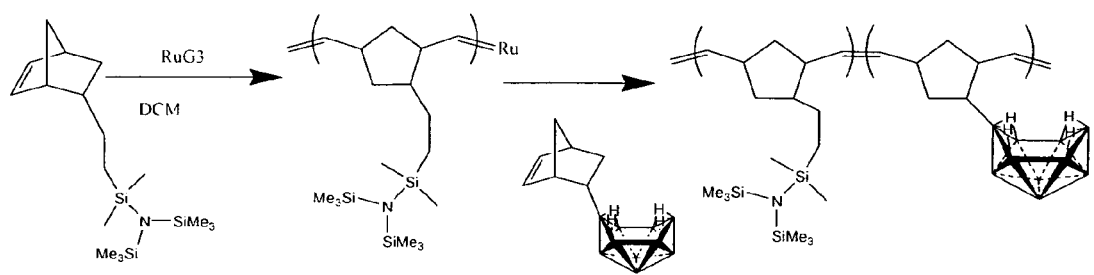
FIG. 18 (Scheme 6) depicts the synthesis of a polynorbornenesilazane-block-polynorbornenedecaborane copolymer by ROMP, in accordance with some embodiments of the present invention.
Figure 19:
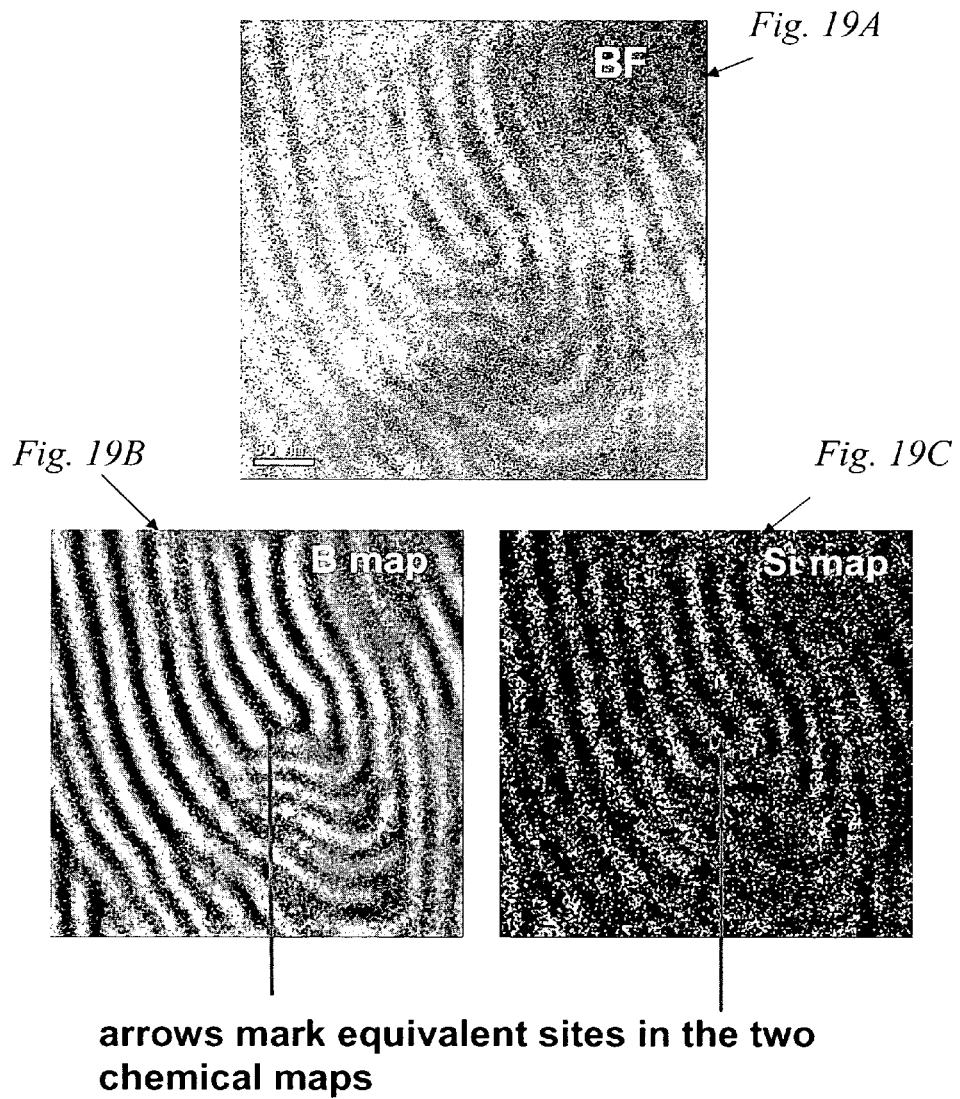
FIGS. 19A-19C are TEM images of lamellar structure (19A), along with chemical maps of boron (19B) and silicon (19C), of self-assembled polynorbornenesilazane-block-polynorbornenedecaborane co-polymer, in accordance with some embodiments of the present invention.

A solution of norbornene-hexamethylsilzane (2.00 g in 36 mL DCM) was cooled to −40° C. using a dry ice acetone bath. This solution was added to a 3 mL solution containing 43 mg of GG3 catalyst. After 30 min. in a bath at about −30° C., a solution of norbornene-decaborane (1.27 g in 10 mL DCM) was added to the reaction mixture. The reaction bath temperature was maintained between −20° C. and −10° C. for 45 min. The reaction was quenched with 2.5 mL of ethyl vinyl ether and stirred for 15 min. at 0° C. The synthesis reaction is shown in Scheme 6 (FIG. 18). The solution was evaporated in an inert atmosphere. Ordered structures were formed during the evaporation. A TEM microstructure is shown in FIG. 19A along with boron (FIG. 19B) and silicon (FIG. 19C) maps. The Si-containing polynorbornenesilazane block and B-containing polynorbornenedecaborane form alternating layers in a lamellar structure.

Figure 20:
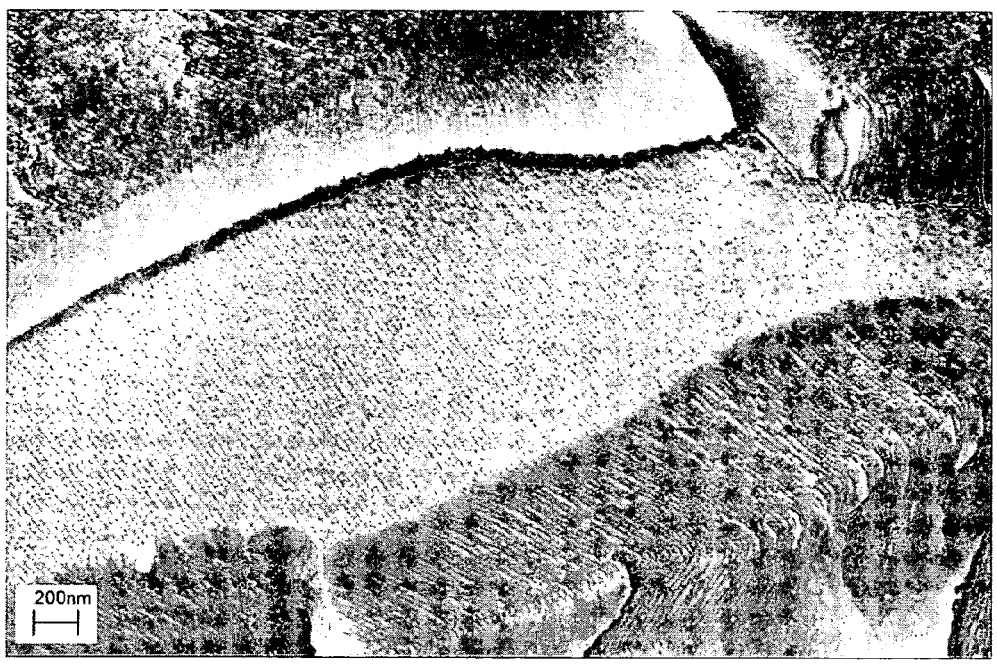
FIG. 20 is an SEM image depicting a pyrolyzed ceramic structure from polynorbornenesilazane-block-polynorbornenedecaborane co-polymer, showing lamellar structure, in accordance with some embodiments of the present invention.

The dried film was then subjected to thermal annealing at 100° C. for 24 hours in a nitrogen atmosphere. The sample was subsequently transferred to a tube furnace where it was heated in an ammonia atmosphere. The pyrolysis process involved heating the sample from room temperature to 400° C. at 5° C./min. followed by a dwell time of 1 hour at 400° C. A subsequent ramp cycle was then used to bring the sample to 1000° C. (1° C./min). The sample was held at 1000° C. for 4 hours. The structure of pyrolyzed ceramics is shown in FIG. 20. The pyrolyzed ceramics shows nano-ordered structure with lamellar morphology, preserving the morphological characteristics of the self-assembled polymer.

It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A method comprising the steps of:
    dissolving a block co-polymer in which at least one of the blocks comprises residues of norbornene or substituted norbornene in a solvent, wherein the block co-polymer comprises at least two blocks that differ in their ability to segregate into at least two phases, and wherein the molecular structure of at least one of the two blocks comprises inorganic elemental constituents suitable for forming a ceramic structure upon pyrolysis;
    evaporating the solvent to cause self-assembly of the block co-polymer into an ordered primary structure having dimensionality in the range of from about 1 nm to about 100 µm; and
    pyrolyzing the primary structure to form a secondary ceramic structure, wherein the inorganic elemental constituents of the at least one block are retained during pyrolysis to form the secondary ceramic structure.

2. The method of claim 1, wherein the block co-polymer is a hybrid block co-polymer.

3. The method of claim 1, further comprising a step of adding a ceramic precursor additive.

4. The method of claim 3, wherein the ceramic precursor additive is selected from the group consisting of polysilazane, polycarborane, polyureasilazane, polysilane, polycarbosilane, polyborazine, polyborazylene, polysiloxane, and combinations thereof.

5. The method of claim 1, wherein the pyrolysis step leads to the formation of a ceramic product selected from the group consisting of a porous ceramic structure, a densified ceramic structure, and combinations thereof.

6. The method of claim 5, wherein the ceramic product comprises a composition selected from the group consisting of silicon carbide, silicon nitride, silicon carbonitride, silicon oxynitride, silicon boron carbonitride, boron nitride, boron carbide, boron carbonitride, silicon oxycarbide, and combinations thereof.

7. The method of claim 1 wherein the block co-polymer is a co-polymer of polynorbornene and polynorbornenedecaborane.

* * * * *